(12) United States Patent
Feng et al.

(10) Patent No.: US 11,360,493 B2
(45) Date of Patent: Jun. 14, 2022

(54) POSITIONING DETECTION DEVICE AND POSITIONING MATERIAL MOVING SYSTEM

(71) Applicant: CITIC Dicastal CO., LTD., Hebei (CN)

(72) Inventors: Haipeng Feng, Qinhuangdao (CN); Zuo Xu, Qinhuangdao (CN); Hailong Liu, Qinhuangdao (CN); Jianfeng Gui, Qinhuangdao (CN); Jiansheng Wang, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 202 days.

(21) Appl. No.: 16/713,614

(22) Filed: Dec. 13, 2019

(65) Prior Publication Data
US 2020/0264637 A1 Aug. 20, 2020

(30) Foreign Application Priority Data

Feb. 15, 2019 (CN) .......................... 201910115584.X

(51) Int. Cl.
*G05D 3/00* (2006.01)
*G05D 3/12* (2006.01)
*G01D 5/347* (2006.01)

(52) U.S. Cl.
CPC .............. *G05D 3/125* (2013.01); *G01D 5/347* (2013.01)

(58) Field of Classification Search
CPC ............................... G05D 3/125; G01D 5/347
See application file for complete search history.

(56) References Cited

U.S. PATENT DOCUMENTS

2020/0141712 A1* 5/2020 Wu ........................... G01B 5/12

* cited by examiner

*Primary Examiner* — Kevin K Pyo
(74) *Attorney, Agent, or Firm* — Cooper Legal Group, LLC

(57) ABSTRACT

The positioning detection device includes a positioning detection combination, a plurality of positioning sheets, an origin position, a negative limit, a positive limit, a controller and an encoder. The positioning material moving system is provided on the basis of the positioning detection device.

8 Claims, 4 Drawing Sheets

| SF | Dst | Src | Fnc | Sta | Tik | Pos | Ser | CRC |
|---|---|---|---|---|---|---|---|---|
| 1byte | 1byte | 1byte | 1byte | 1byte | 2byte | 4byte | 2byte | 2byte |

FIG. 4

POSITIONING DETECTION DEVICE AND POSITIONING MATERIAL MOVING SYSTEM

CROSS-REFERENCE TO RELATED APPLICATIONS

The present application claims benefit of Chinese Patent Application No. 201910115584.X, filed on Feb. 15, 2019, the contents of which are hereby incorporated by reference in their entirety.

BACKGROUND

The traditional aluminum melt adding of low-pressure casting machines of aluminum alloy wheels is mainly completed by virtue of manual forklift or overhead traveling crane driving, and mature intelligent low-pressure casting material movers are absent. Aluminum melt is high-temperature liquid and is prone to danger during transportation and loading-unloading, a premise for designing an intelligent low-pressure casting material mover is that the precise positioning of the material mover and real-time control on a loading-unloading connecting process must be achieved, and thus, safe transportation and loading-unloading processes can be achieved. The traditional servo systems can achieve relatively precise positioning by using an encoder, however, position errors caused by wheel slip, motor shaft coupling disconnection, encoder hardware faults and so on cannot be detected.

SUMMARY

The present application relates to the technical field of material moving of automatic production lines and particularly relates to a positioning detection device and a positioning material moving system.

Embodiments of the present application provide a positioning detection device and a positioning material moving system. The accuracy and reliability of positioning are improved through comparing values of the encoder during passing-through of the positioning sheets with pre-set input values. The accuracy of a connecting position is further guaranteed by successful positioning of the positioning pin and an output signal of a positioning pin in-place sensor; In addition, due to state guaranteed communication between the material mover and the material taking point, the first machine, the second machine or etc., timely monitoring and processing of a moving process and state of a furnace loaded with raw materials or an empty furnace by two connected parties are guaranteed.

In order to achieve the above-mentioned object, the present application provides a technical scheme as follows:

In a first aspect, a positioning detection device is provided and includes a positioning detection combination, a plurality of positioning sheets, an origin position, a negative limit, a positive limit, a controller and an encoder; the positive limit and the negative limit are located at the two ends of a moving track of a moving carrier, the origin position is close to the negative limit, and the plurality of positioning sheets are distributed between the origin position and the positive limit; in which all the positioning sheets have the same length and width sizes, and the positioning sheets are perforated at N-row M-column specific positions for numbering, information of perforated holes in each positioning sheet is different; the positioning detection combination includes N vertically-arranged small-hole identification sensors fixed onto a bracket, the small-hole identification sensors can identify whether the positioning sheets are perforated or not, and the N vertically-arranged small-hole identification sensors of the positioning detection combination can pass through M columns of holes in each positioning sheet successively; in which M and N are positive integers, N is greater than or equal to 2, and M is greater than or equal to 2; the origin position, the positive limit and the negative limit are proximity switches or position sensors; the positioning detection combination and the controller are located on the moving carrier, and the positioning sheets are located at target positions; the positioning detection combination, the origin position, the negative limit and the positive limit are all electrically connected with the controller, the encoder is in signal connection with the controller, and the controller can read codes of the encoder according to information of perforated holes in the positioning sheets detected by the positioning detection combination.

In some embodiments, the small-hole identification sensors are optical fiber sensors, and diameters of effective spots of the optical fiber sensors are smaller than those of small-holes in the positioning sheets.

In some embodiments, the positioning sheets include a material-receiving positioning sheet of a material taking point, an empty-furnace feeding positioning sheet of the material taking point, feeding positioning sheets of target positions and empty-furnace taking positioning sheets of target positions.

In a second aspect, embodiments of the present application provide a positioning material moving system, including the above-mentioned positioning detection device. The positioning material moving system also includes a material mover, a material mover track, a material taking point, a first machine, a second machine, . . . and a $Q^{th}$ machine, in which Q is a positive integer, and $Q \leq 2M*N$; a material-receiving positioning sheet of the material taking point and an empty-furnace feeding positioning sheet of the material taking point are separately arranged at the two sides of the material taking point along the material mover track, corresponding feeding positioning sheets and empty-furnace taking positioning sheets are separately arranged at the two sides of the first machine, the second machine, . . . and the $Q^{th}$ machine along the material mover track, the positive limit and the negative limit are arranged at the two ends of the material mover track, and the origin position is close to a position of the negative limit; a furnace loaded with materials and an empty furnace are separately placed on the left and right sides of the positioning detection combination on the material mover; the positioning detection combination and the controller are located on the material mover; a servo drive, a material mover motor and an encoder are further arranged on the material mover, the controller is connected with the servo drive, and the servo drive is connected with the material mover motor and drives the material mover motor; the encoder is connected with the servo drive, and the controller records values of the encoder, which serve as position information, when the positioning detection combination passes through the positioning sheets; the controller on the material mover can be in communication connection with the material taking point, the first machine, the second machine, . . . and a $Q^{th}$ machine; an action positioning mechanism is arranged on the material mover, can fix a position of the material mover at the material taking point, the first machine, the second machine, . . . and the $Q^{th}$ machine and outputs a successful or failing positioning signal to the material mover and the material taking point, the first machine, the second machine, . . . and the $Q^{th}$ machine fixed to the material mover.

In some embodiments, the action positioning mechanism includes a material-receiving pin hole of the material taking point and an empty-furnace feeding pin hole of the material taking point, which are arranged at corresponding positions of the two sides of the material taking point along the material mover track, and feeding pin holes and empty-furnace taking pin holes, which are arranged at corresponding positions of the two sides of the first machine, the second machine, . . . and the $Q^{th}$ machine along the material mover track, and a positioning pin, a positioning air cylinder and a positioning pin in-place sensor are arranged on the material mover; the positioning pin in-place sensor is mounted at a middle position of a stroke of the positioning air cylinder, the positioning air cylinder exactly stretches to the middle position of the stroke after the positioning pin is rightly pinned into one of the material-receiving pin hole of the material taking point, the empty-furnace feeding pin hole of the material taking point, the feeding pin holes and the empty-furnace taking pin holes, and then, the positioning pin in-place sensor outputs a high level; the positioning pin in-place sensor outputs a low level when the positioning air cylinder stretches fully due to the fact that the positioning pin is pinned to a position free of any obstacle or the positioning air cylinder does not stretch to the middle position due to the fact that the positioning pin is blocked by the edge of one of the pin holes.

In some embodiments, compressed air employed by the positioning air cylinder has the pressure of 2.5 bar to 5 bar, and a compressed air supply end of the air cylinder is provided with an adjustable pressure relief valve.

In some embodiments, an inlet of each pin hole employs a horn-shaped structure, each pin hole is placed horizontally, and the underside of the bottom of each pin hole has a bigger opening which is downward.

In some embodiments, the positioning material moving system further includes a system management host and a human-machine interface, the human-machine interface is in signal connection with the controller, the system management host is connected with the controller by a network bus, and the controller is in communication with the material taking point, the first machine, the second machine, . . . and the $Q^{th}$ machine by a network bus.

Compared with the prior art, the present application has the beneficial effects that: the present application provides a positioning detection device. The accuracy and reliability of positioning are improved through comparing values of the encoder during passing-through of the positioning sheets with pre-set input values. A positioning material moving system is provided on the basis of the positioning detection device. The accuracy of a connecting position is further guaranteed by successful positioning of the positioning pin and an output signal of a positioning pin in-place sensor; and due to state guaranteed communication between the material mover and the material taking point, the first machine, the second machine or etc., timely monitoring and processing of a moving process and state of a furnace loaded with raw materials or an empty furnace by two connected parties are guaranteed. Clearly, the positioning material moving system is accurate and reliable in positioning, high in safety, low in cost, convenient to operate and high in practicability and provides a safe positioning foundation for an intelligent low-pressure casting material mover.

BRIEF DESCRIPTION OF THE DRAWINGS

In order to more clearly explain the technical solution in the embodiments of the application, drawings which require to be used in description of the embodiments are simply introduced below, obviously, the drawings in description below are some embodiments of the application, and those having ordinary skill in the art can further acquire other drawings without creative efforts according to those drawings.

FIG. 4 is a frame format diagram of state guarantee frames of the present disclosure;

Figure 1:
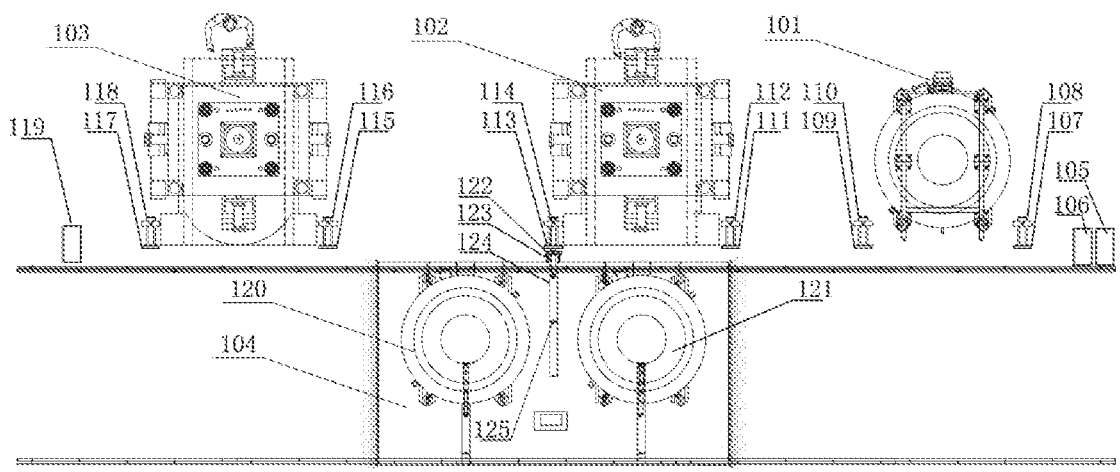
FIG. 1 is a constitutional diagram of a positioning material moving system of an embodiment I of the present disclosure.
Figure 2:
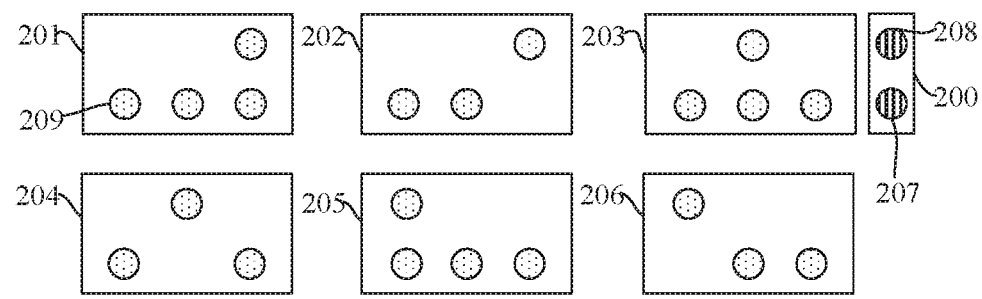
FIG. 2 is structural diagrammatic drawing of a positioning detection combination and positioning sheets.

in which: 101—material taking point, 102—first machine, 103—second machine, 104—material mover, 105—negative limit, 106—origin position, 107—material-receiving positioning sheet of material taking point, 108—material-receiving pin hole of material taking point, 109—empty-furnace feeding positioning sheet of material taking point, 110—empty-furnace feeding pin hole of material taking point, 111—feeding positioning sheet of first machine, 112—feeding pin hole of first machine, 113—empty-furnace taking positioning sheet of first machine, 114—empty-furnace taking pin hole of first machine, 115—feeding positioning sheet of second machine, 116—feeding pin hole of second machine, 117—empty-furnace taking positioning sheet of second machine, 118—empty-furnace taking pin hole of second machine, 119—positive limit, 122—positioning detection combination, 123—positioning pin, 124—positioning air cylinder, 125—positioning pin in-place sensor, F1—first circuit breaker, F2—second circuit breaker, V1—direct-current power supply, VF1—servo drive, CPU1—controller, U1—material mover motor, K1—servo enable relay, K2—positioning pin stretching relay, HMI1—operating interface, SM1—system management host, NET1—network bus, 120—furnace loaded with aluminum melt, 121—empty furnace, 201—local enlarged view of material-receiving positioning sheet of material taking point, 202—local enlarged view of empty-furnace feeding positioning sheet of material taking point, 203—local enlarged view of feeding positioning sheet of first machine, 204—local enlarged view of empty-furnace taking positioning sheet of first machine, 205—local enlarged view of feeding positioning sheet of second machine, 206—local enlarged view of empty-furnace taking positioning sheet of second machine, 200—local enlarged view of positioning detection combination on material mover, 207—first small-hole identification sensor mounting position, 208—second small-hole identification sensor mounting position, 209—detection small-hole, B1—positive limit electrical symbol, B2—negative limit electrical symbol, B3—origin position electrical symbol, B4—first running in-place sensor electrical symbol, B5—second running in-place sensor electrical symbol, B6—positioning pin in-place sensor.

DETAILED DESCRIPTION

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'include' and 'have' as well as their any variations are intended to cover a non-exclusive inclusion. For example, a process, method, system, product or equipment including a series of steps or units does not limit steps or units which have been listed, but selectively further includes steps or units which are not listed, or selectively further includes other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

In order to further understand the content, features and functions of the disclosure, the following embodiments are given and illustrated with the attached drawings as follows.

Embodiment 1

The embodiment of the present application is described with reference to drawings 1-4 below.

FIG. 1 shows a positioning material moving system which is provided with machines, i.e., a first machine and a second machine, and positioning sheets have the same length and width sizes, and are perforated at 2-row 3-column specific positions for numbering.

Firstly, a positioning detection device is provided and includes a positioning detection combination 122, a plurality of positioning sheets, an origin position 106, a negative limit 105, a positive limit 119, a controller CPU1 and an encoder CN3; the positive limit 119 and the negative limit 105 are located at the two ends of a moving track of a moving carrier, the origin position 106 is close to the negative limit, and the plurality of positioning sheets are distributed between the origin position 106 and the positive limit 119; in which all the positioning sheets have the same length and width sizes, and are perforated at N-row M-column specific positions for numbering, in which M and N are positive integers, N≥2, and M≥2; in the embodiment, N=2, and M=3; the positioning detection combination 122 includes 2 vertically-arranged small-hole identification sensors fixed onto a bracket, the small-hole identification sensors can identify whether the positioning sheets are perforated or not, and the 2 vertically-arranged small-hole identification sensors of the positioning detection combination can pass through 3 columns of holes in each positioning sheet successively; the origin position 106, the positive limit 119 and the negative limit 105 are proximity switches or position sensors; the positioning detection combination 122 and the controller are located on the moving carrier, and the positioning sheets are located at target positions; and the positioning detection combination 122, the origin position 106, the negative limit 105 and the positive limit 119 are all electrically connected with the controller CPU1, the encoder CN3 is in signal connection with the controller CPU1, and the controller CPU1 can read codes of the encoder CN3 according to information of perforated holes in the positioning sheets detected by the positioning detection combination 122.

In the embodiment, the small-hole identification sensors are optical fiber sensors, and diameters of effective spots of the optical fiber sensors are smaller than those of small-holes in the positioning sheets. The positioning detection combination 122 on the material mover is composed of two optical fiber sensors 207 and 208 which are fixed onto a bracket and are vertically arranged up and down. Diameters of effective spots of the optical fiber sensors 207 and 208 are smaller than those of the small-holes in the positioning sheets. The positioning detection combination 122 on the material mover achieves judgment on six positions through the two optical fiber sensors 207 and 208.

In the embodiment, the quantity of the positioning sheets is determined according to the quantity of machines to be positioning, and 2 machines, i.e., the first machine and the second machine are provided in the embodiment. The positioning sheets include a material-receiving positioning sheet of a material taking point, an empty-furnace feeding positioning sheet of the material taking point, a feeding positioning sheet of the first machine, an empty-furnace taking positioning sheet of the first machine, a feeding positioning sheet of the second machine and an empty-furnace taking positioning sheet of the second machine.

A positioning detection method for performing positioning by using the positioning detection device in the embodiment includes: the controller records values of the encoder when the positioning detection combination on the moving carrier forwardly passes through all columns of holes in each positioning sheet from the origin position or values of the encoder when the positioning detection combination on the moving carrier passes through all the columns of holes in each positioning sheet and reversely returns to an origin, and the values serve as initial encoded values of each positioning sheet; the moving carrier runs to a target position, and values of the encoder when the positioning detection combination on the moving carrier passes through all columns of holes in the corresponding positioning sheet at the target position are compared with the initial encoded values of the corresponding positioning sheet at the target position; the position is judged as a safe positioning position when deviations between the values of the encoder corresponding to each column of holes at this time and initial encoded values of the corresponding column of holes are smaller than set values and detection signals of the positioning detection combination on the moving carrier during passing-through of each column of holes are matched with perforated holes in the corresponding positioning sheet at the target position.

Figure 3:
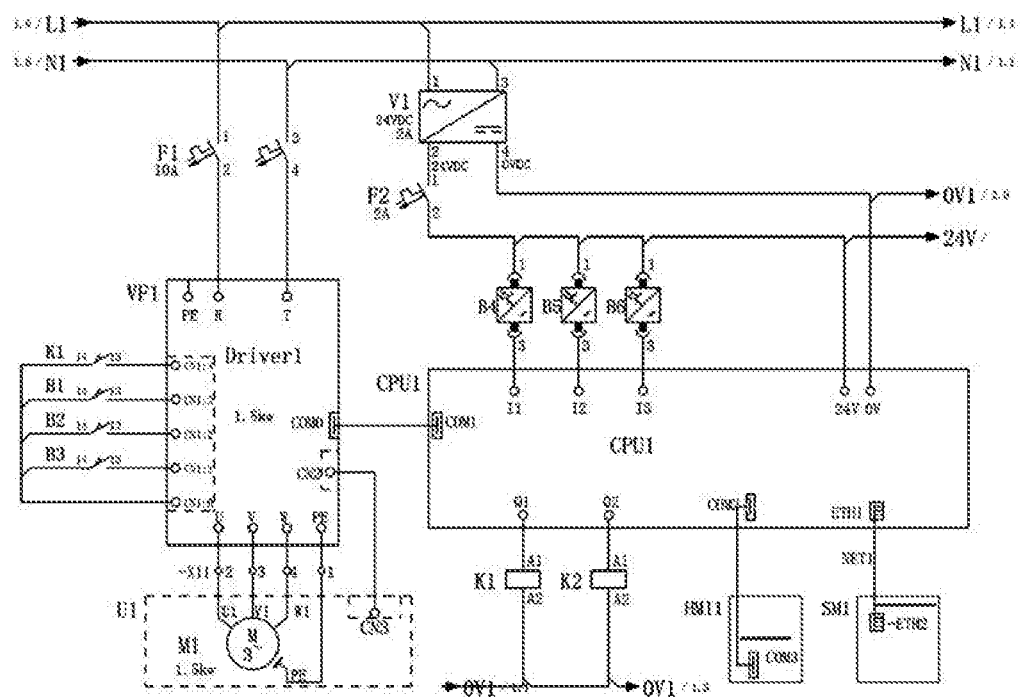
FIG. 3 is an electrical schematic diagram of a positioning material moving system of an embodiment I of the present disclosure.

Specifically, with reference to FIG. 1 and FIG. 3, the positioning material moving system in the embodiment includes the above-mentioned positioning detection device, Q=2, and the positioning material moving system further includes a material mover 104, a material mover track, a material taking point 101, a first machine 102 and a second machine 103; in which, a material-receiving positioning sheet 107 of the material taking point, an empty-furnace feeding positioning sheet 109 of the material taking point, a feeding positioning sheet 111 of the first machine, an empty-furnace taking positioning sheet 113 of the first machine, a feeding positioning sheet 115 of the second machine and an empty-furnace taking positioning sheet 117 of the second machine are separately arranged at the two sides of the material taking point 101, the positive limit 119 and the negative limit 105 are arranged at the two ends of the material mover track, and the origin position 106 is close to a position of the negative limit 105; the material mover 104 has double stations, and a furnace loaded with raw materials 120 and an empty furnace 121 can be simultaneously placed on the material mover left and right; the positioning detection combination 122 and the controller CPU1 are located on the material mover 104; a servo drive VF1, a material mover motor U1 and an encoder CN3 are further arranged on the material mover 104, the controller CPU1 is connected with the servo drive VF1, and the servo drive VF1 is connected with the material mover motor U1 and drives the material mover motor U1; the encoder CN3 is connected with the servo drive VF1, and the controller CPU1 records values of the encoder CN3, which serve as position information, when the positioning detection combination 122 passes through the positioning sheets; the controller on the material mover can be in communication connection with the material taking point, the first machine and the second machine; an action positioning mechanism is arranged on the material mover, can fix a position of the material mover at the material taking point, the first machine or the second machine and outputs a successful or failing positioning signal to the material mover and the material taking point, the first machine or the second machine fixed to the material mover.

In the embodiment, the positioning material moving system further includes a system management host SM1 and a human-machine interface HMI1, the human-machine interface HMI1 is in signal connection with the controller CPU1, the system management host SM1 is connected with the controller CPU1 by a network bus, and the controller CPU1 is in communication with the material taking point 101, the first machine 102 and the second machine 103 by a network bus. State guaranteed communication is always kept during the connecting of two connected parties, so that the timeliness and reliability of communication data are guaranteed, and the condition that risks such as jamming, colliding and toppling are caused due to the fact that the other party is not acknowledged in time and continues to move when one party is in failure and gives an alarm during connecting is prevented. In addition, the state guaranteed communication is only performed during connecting, so that network resources are saved, and normal running of network communication data of an entire system in time periods except for a connecting process is guaranteed.

In the embodiment, the action positioning mechanism includes a material taking point material-receiving pin hole 108, an empty-furnace feeding pin hole 110 of the material taking point, a feeding pin hole 112 of the first machine, an empty-furnace taking pin hole 114 of the first machine, a feeding pin hole 116 of the second machine and an empty-furnace taking pin hole 118 of the second machine, which are arranged at corresponding positions of the two sides of the material taking point along the material mover track, and a positioning pin 123, a positioning air cylinder 124 and a positioning pin in-place sensor 125 are arranged on the material mover; the positioning pin in-place sensor 125 is mounted at a middle position of a stroke of the positioning air cylinder 124, the positioning air cylinder 124 exactly stretches to the middle position of the stroke after the positioning pin 123 is rightly pinned into one of the material-receiving pin hole 108 of the material taking point, the empty-furnace feeding pin hole 110 of the material taking point, the feeding pin hole 112 of the first machine, the empty-furnace taking pin hole 114 of the first machine, the feeding pin hole 116 of the second machine and the empty-furnace taking pin hole 118 of the second machine, and then, the positioning pin in-place sensor 125 outputs a high level; the positioning pin in-place sensor 125 outputs a low level when the positioning air cylinder stretches fully due to the fact that the positioning pin 123 is pinned to a position free of any obstacle or the positioning air cylinder does not stretch to the middle position due to the fact that the positioning pin is blocked by the edge of one of the pin holes.

In the embodiment, the condition that the time from stretching beginning of the positioning air cylinder 124 to judgment beginning of an output state of the positioning pin in-place sensor 125 is slightly longer than the time from the stretching beginning of the positioning air cylinder 124 to stretching of the positioning air cylinder 124 to a full-stroke position is adopted. Compressed air employed by the positioning air cylinder 124 has the pressure of 2.5 bar to 5 bar, and a compressed air supply end of the air cylinder is provided with an adjustable pressure relief valve.

In the embodiment, an inlet of each pin hole employs a horn-shaped structure, each pin hole is placed horizontally, the underside of the bottom of each pin hole has a bigger opening which is downward, and thus, dust, foreign substances and so on can be easily discharged from the openings.

A positioning material moving method of the positioning material moving system in the embodiment includes the steps as follows:

In step 1, origin returning: the material mover finds the origin position according to the positive limit and the negative limit, and a current value of the encoder is automatically set as a system null point simultaneously.

In step 2, automatic inputting: the material mover automatically runs from the origin position to the positive limit and returns to the origin position at a relatively low speed, and the controller records values of the encoder, i.e., $\{CF_{11}, CF_{12}, CF_{13}; CF_{21}, CF_{22}, CF_{23}; CF_{31}, CF_{32}, CF_{33}\}$ when the material mover forwardly passes through 3 columns of holes in each of the material-receiving positioning sheet of the material taking point, the feeding positioning sheet of the first machine and the feeding positioning sheet of the second machine; the controller records values of the encoder, i.e., $\{CR_{31}, CR_{32}, CR_{33}; CR_{21}, CR_{22}, CR_{23}; CR_{11}, CR_{12}, CR_{13}\}$ when the material mover reversely passes through M columns of holes in each of the empty-furnace feeding positioning sheet of the material taking point, the empty-furnace taking positioning sheet of the first machine and the empty-furnace taking positioning sheet of the second machine.

In step 3, automatic running: the material mover waits for receiving a feeding request from either the first machine or the second machine at the origin position, the material mover runs to a material taking position of the material taking point when the material mover receives the feeding request from the first machine, and values of the encoder, i.e., $CF'_{11}$, $CF'_{12}$, $CF'_{13}$ when the positioning detection combination on the material mover passes through 3 columns of holes in the material-receiving positioning sheet of the material taking point are compared; a next step is performed when deviations between the values of the encoder, i.e., $CF'_{11}$, $CF'_{12}$, $CF'_{13}$ and input values, i.e., $CF_{11}$, $CF_{12}$, $CF_{13}$ of a corresponding position are all smaller than a set value $\Delta F_0$ and detection signals of the positioning detection combination on the material mover during passing-through of the 3 columns of holes are matched with perforated holes in the material-receiving positioning sheet of the material taking point; otherwise, the material mover returns to the origin position again and moves to a position of the material-receiving positioning sheet of the material taking point from an origin once more.

In step 4, the material mover starts to establish state guaranteed communication with the material taking point and sends a state guaranteed communication establishing request to the material taking point, the material mover starts to send a state guaranteed communication data request to the material taking point at fixed frequency after the material mover receives state guaranteed communication establishing response from the material taking point, and the material taking point sends state guaranteed communication data response to the material mover each time after the state guaranteed communication data request is received; either the material taking point or the material mover gives an alarm when the material taking point does not receive the state guaranteed communication data request in specified time or the material mover does not receive state guaranteed communication data in specified time. In the embodiment, the fixed frequency is 0.05 second per time.

In step 5, the material mover and the material taking point achieve that the material mover is fixed to a material taking position of the material taking point through the action positioning mechanism, a successful positioning signal is output when fixing is successful, and a next step is performed; a failure signal is output to the material mover and the material taking point when fixing fails, and both the material mover and the material taking point stop actions, give an alarm and wait for manual fault processing.

In step 6, the material mover starts material-receiving action, and then, a furnace loaded with materials starts to slowly move onto the material mover from the material taking point under the action of a driving mechanism at one side of the material taking point; when either the material taking point or the material mover gives an alarm due to failure during moving, the other party will be informed immediately by state guaranteed communication, and both the material mover and the material taking point stop actions, give an alarm and wait for manual fault processing.

In step 7, the material mover ends up state guaranteed communication with the material taking point, the material mover runs to an empty-furnace taking position of the first machine, and values of the encoder, i.e., $CR'_{21}$, $CR'_{22}$, $CR'_{23}$ when the positioning detection combination on the material mover passes through 3 columns of holes in the empty-furnace taking positioning sheet of the first machine are compared; a next step is performed when deviations between the $CR'_{21}$, $CR'_{22}$, $CR'_{23}$ and input values, i.e., $CR_{21}$, $CR_{22}$, $CR_{23}$ of a corresponding position are all smaller than a set value $\Delta R_0$ and detection signals of the positioning detection combination on the material mover during passing-through of the 3 columns of holes are matched with perforated holes in the empty-furnace taking positioning sheet of the first machine; otherwise, the material mover returns to the origin position again and moves to the empty-furnace taking position of the first machine from an origin once more.

In step 8, the material mover starts to establish state guaranteed communication with the first machine and sends a state guaranteed communication establishing request to the first machine, the material mover starts to send a state guaranteed communication data request to the first machine at fixed frequency after the material mover receives state guaranteed communication establishing response from the first machine, and the first machine sends state guaranteed communication data response to the material mover each time after the state guaranteed communication data request is received; either the first machine or the material mover gives an alarm when the first machine does not receive the state guaranteed communication data request in specified time or the material mover does not receive state guaranteed communication data in specified time. In the embodiment, the fixed frequency is 0.05 second per time.

In step 9, the material mover and the first machine achieve that the material mover is fixed to the empty-furnace taking position of the first machine through the action positioning mechanism, a successful positioning signal is output when fixing is successful, and a next step is performed; a failure signal is output to the material mover and the material taking point when fixing fails, and both the material mover and the material taking point stop actions, give an alarm and wait for manual fault processing.

In step 10, the material mover starts the empty-furnace taking action, and then, an empty furnace starts to slowly move onto the material mover from the first machine under the action of a driving mechanism at one side of the first machine; when either the first machine or the material mover gives an alarm due to failure during moving, the other party will be informed immediately by state guaranteed communication, and both the material mover and the first machine stop actions, give an alarm and wait for manual fault processing.

In step 11, the material mover ends up state guaranteed communication with the first machine, the material mover runs to a position of the feeding positioning sheet of the first machine, and values of the encoder, i.e., $CF'_{21}$, $CF'_{22}$, $CF'_{23}$ when the positioning detection combination on the material mover passes through 3 columns of holes in the feeding positioning sheet of the first machine are compared; a next step is performed when deviations between the values of the encoder, i.e., $CF'_{21}$, $CF_{22}$, $CF_{23}$ and input values, i.e., $CF_{21}$, $CF_{22}$, $CF_{23}$ of a corresponding position are all smaller than a set value $\Delta F_0$ and detection signals of the positioning detection combination on the material mover during passing-through of the 3 columns of holes are matched with perforated holes in the feeding positioning sheet of the first machine; otherwise, the material mover returns to the origin position again and moves to the position of the feeding positioning sheet of the first machine from an origin once more.

In step 12, the material mover starts to establish state guaranteed communication with the first machine and sends a state guaranteed communication establishing request to the first machine, the material mover starts to send a state guaranteed communication data request to the first machine at fixed frequency after the material mover receives state guaranteed communication establishing response from the first machine, and the first machine sends state guaranteed communication data response to the material mover each time after the state guaranteed communication data request is received; otherwise, either the material mover or the first machine gives an alarm when the first machine does not receive the state guaranteed communication data request in specified time or the material mover does not receive state guaranteed communication data in specified time. In the embodiment, the fixed frequency is 0.05 second per time.

In step 13, the material mover and the first machine achieve that the material mover is fixed to a feeding position of the first machine through the action positioning mechanism, a successful positioning signal is output when fixing is successful, and a next step is performed; a failure signal is output to the material mover and the first machine when fixing fails, and both the material mover and the first machine stop actions, give an alarm and wait for manual fault processing.

In step 14, the first machine starts material-receiving action, and then, a furnace loaded with materials starts to slowly move onto the first machine from the material mover under the action of a driving mechanism at one side of the first machine; when either the first machine or the material mover gives an alarm due to failure during moving, the other party will be informed immediately by state guaranteed communication, and both the material mover and the first machine stop actions, give an alarm and wait for manual fault processing.

In step 15, the material mover ends up state guaranteed communication with the first machine, the material mover runs to an empty-furnace feeding position of the material taking point, and values of the encoder, i.e., $CR'_{11}$, $CR'_{12}$, $CR'_{13}$ when the positioning detection combination on the material mover passes through 3 columns of holes in the empty-furnace feeding positioning sheet of the material taking point are compared; a next step is performed when deviations between the $CR'_{11}$, $CR'_{12}$, $CR'_{13}$ and input values, i.e., $CR_{11}$, $CR_{12}$, $CR_{13}$ of a corresponding position are all smaller than a set value $\Delta R_0$ and detection signals of the positioning detection combination on the material mover during passing-through of the 3 columns of holes are matched with perforated holes in the empty-furnace feeding positioning sheet of the material taking point; otherwise, the material mover returns to the origin position again and moves to the empty-furnace feeding position of the material taking point from an origin once more.

In step 16, the material mover starts to establish state guaranteed communication with the material taking point again and sends a state guaranteed communication establishing request to the material taking point, the material mover starts to send a state guaranteed communication data request to the material taking point at fixed frequency after the material mover receives state guaranteed communication establishing response from the material taking point, and the material taking point sends state guaranteed communication data response to the material mover each time after the state guaranteed communication data request is received; otherwise, either the material taking point or the material mover gives an alarm when the material taking point does not receive the state guaranteed communication data request in specified time or the material mover does not receive state guaranteed communication data in specified time. In the embodiment, the fixed frequency is 0.05 second per time.

In step 17, the material mover and the material taking point achieve that the material mover is fixed to the empty-furnace feeding position of the material taking point through the action positioning mechanism, a successful positioning signal is output when fixing is successful, and a next step is performed; a failure signal is output to the material mover and the material taking point when fixing fails, and both the material mover and the material taking point stop actions, give an alarm and wait for manual fault processing.

In step 18, the material mover starts the empty-furnace feeding action, and then, an empty furnace starts to slowly move onto the material taking point from the material mover under the action of a driving mechanism at one side of the material taking point; when either the material taking point or the material mover gives an alarm due to failure during moving, the other party will be informed immediately by state guaranteed communication, and both the material mover and the material taking point stop actions, give an alarm and wait for manual fault processing.

In step 19, the material mover ends up state guaranteed communication with the material taking point; the operation returns back to the step 3.

In the embodiment, in the step 2, values of the encoder during forward passing-through of the 3 columns of holes in each of the material-receiving positioning sheet of the material taking point, the feeding positioning sheet of the first machine and the feeding positioning sheet of the second machine and values of the encoder during reverse passing-through of the 3 columns of holes in each of the empty-furnace feeding positioning sheet of the material taking point, the empty-furnace taking positioning sheet of the first machine and the empty-furnace taking positioning sheet of the second machine can be manually set or revised, and thus, position values can be rapidly and correctly obtained.

In the embodiment, in steps 3, 7, 11 and 15, both $\Delta F_0$ and $\Delta R_0$ are 1.0 mm.

In the embodiment, the material mover is decelerated and runs at a slow speed when the condition that the material mover is close to a target positioning sheet is judged through the values of the encoder in the steps 3, 7, 11 and 15, and the small-hole identification sensors of the positioning detection combination exactly detect last columns of holes in the positioning sheets when the material mover reaches correct material taking, empty-furnace feeding, empty-furnace taking and feeding positions.

In the embodiment, the state guaranteed communication performs data communication by adopting state guarantee frames, and frame formats of the state guarantee frames are shown in FIG. 4, i.e., 1-byte frame header, 1-byte target address, 1-byte source address, 1-byte function code, 1-byte state code, 2-byte time serial number, 4-byte position code, 2-byte serial number and 2-byte CRC. Herein, the function code employs a decimal system, 1 represents a state guaranteed communication establishing request, 2 represents state guaranteed communication establishing request, 3 represents a state guaranteed communication data request, 4 represents state guaranteed communication data response, 5 represents a state guaranteed communication disconnecting request, and 6 represents state guaranteed communication disconnecting response. The state guarantee frames are in the frame formats of user data of an application layer in communication protocols and can be conveniently achieved in various different communication protocols.

In the embodiment, during position fixing of two parties in steps 5, 9, 13 and 17, the time from stretching beginning of the positioning air cylinder to judgment beginning of an output state of the positioning pin in-place sensor is slightly longer than the time from the stretching beginning of the positioning air cylinder to stretching of the positioning air cylinder to a full-stroke position.

Visibly, the present application provides a positioning detection device, a positioning detection method, a positioning material moving system and a positioning material moving method. Values of the encoder CN3 during passing-through of the positioning sheets 107, 109, 111, 113, 115 and 117 are compared with pre-set input values, and thus, a correct position of the material mover 104 is accurately ensured. The exactness of a connecting position is further guaranteed by successful positioning of the positioning pin 123; due to state guaranteed communication between the material mover 104 and the material taking point 101, the first machine 102 or the second machine 103, timely monitoring and processing of a moving process and state of a furnace loaded with aluminum melt 120 or an empty furnace 121 by two connected parties are guaranteed; the state guaranteed communication is only performed during connecting, so that network resources are saved, and normal running of network communication data of an entire system in time periods except for a connecting process is guaranteed. Clearly, the positioning material moving system and the positioning material moving method are accurate and reliable in positioning, high in safety, low in cost, convenient to operate and high in practicability and provides a safe positioning foundation for an intelligent low-pressure casting material mover.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

The invention claimed is:

1. A positioning detection device, comprising a positioning detection combination, a plurality of positioning sheets, an origin position, a negative limit, a positive limit, a controller and an encoder; the positive limit and the negative limit are located at two ends of a moving track of a moving carrier, the origin position is close to the negative limit, and the positioning sheets are distributed between the origin position and the positive limit;
wherein all of the positioning sheets have a same length and same width sizes, and the positioning sheets are perforated at N-row M-column specific positions for numbering, information of perforated holes in each positioning sheet of the positioning sheets is different;
the positioning detection combination comprises N vertically-arranged small-hole identification sensors fixed onto a bracket, the N vertically-arranged small-hole identification sensors are configured to identify whether the positioning sheets are perforated or not, and the N vertically-arranged small-hole identification sensors of the positioning detection combination are configured to pass through M columns of the perforated holes in each positioning sheet of the positioning sheets successively; wherein M and N are positive integers, N is greater than or equal to 2, and M is greater than or equal to 2;
the origin position, the positive limit and the negative limit are proximity switches or position sensors; the positioning detection combination and the controller are located on the moving carrier, and the positioning sheets are located at target positions; and
the positioning detection combination, the origin position, the negative limit and the positive limit are all electrically connected with the controller, the encoder is in signal connection with the controller, and the controller is configured to read codes of the encoder according to information of perforated holes in the positioning sheets detected by the positioning detection combination.

2. The positioning detection device according to claim 1, wherein the N vertically-arranged small-hole identification sensors are optical fiber sensors, and diameters of effective spots of the optical fiber sensors are smaller than diameters of small-holes in the positioning sheets.

3. The positioning detection device according to claim 1, wherein the positioning sheets comprise a material-receiving positioning sheet of a material taking point, an empty-furnace feeding positioning sheet of the material taking point, feeding positioning sheets of target positions and empty-furnace taking positioning sheets of target positions.

4. A positioning material moving system, comprising the positioning detection device according to claim 1, further comprising a material mover, a material mover track, a material taking point, and first to $Q^{th}$ machines, wherein Q is a positive integer, and $Q \leq 2^{M*N}$; a material-receiving positioning sheet of the material taking point and an empty-furnace feeding positioning sheet of the material taking point are separately arranged at two sides of the material taking point along the material mover track, corresponding feeding positioning sheets and empty-furnace taking positioning sheets are separately arranged at two sides of the first to $Q^{th}$ machines along the material mover track, the positive limit and the negative limit are arranged at two ends of the material mover track, and the origin position is close to a position of the negative limit;
a furnace loaded with materials and an empty furnace are separately placed on left and right sides of the positioning detection combination on the material mover;
the positioning detection combination and the controller are located on the material mover; a servo drive, a material mover motor and the encoder are further arranged on the material mover, the controller is connected with the servo drive, and the servo drive is connected with the material mover motor and drives the material mover motor; the encoder is connected with the servo drive, and the controller records values of the encoder, which serve as position information, when the positioning detection combination passes through the positioning sheets;
the controller on the material mover is configured to be in communication connection with the material taking point and the first to $Q^{th}$ machines;
an action positioning mechanism is arranged on the material mover and is configured to fix a position of the material mover at the material taking point and the first to $Q^{th}$ machines and to output a successful or failing positioning signal to the material mover and the material taking point, the first to $Q^{th}$ machines are fixed to the material mover.

5. The positioning material moving system according to claim 4, wherein the action positioning mechanism comprises a material-receiving pin hole of the material taking point and an empty-furnace feeding pin hole of the material taking point, which are arranged at corresponding positions of the two sides of the material taking point along the material mover track, and feeding pin holes and empty-furnace taking pin holes, which are arranged at corresponding positions of the two sides of the first to $Q^{th}$ machines along the material mover track, and a positioning pin, a positioning air cylinder and a positioning pin in-place sensor are arranged on the material mover; the positioning pin in-place sensor is mounted at a middle position of a stroke of the positioning air cylinder, the positioning air cylinder exactly stretches to the middle position of the stroke after the positioning pin is rightly pinned into one of the material-receiving pin hole of the material taking point, the empty-furnace feeding pin hole of the material taking point, the feeding pin holes or the empty-furnace taking pin holes, and then, the positioning pin in-place sensor outputs a high level; the positioning pin in-place sensor outputs a low level when the positioning air cylinder stretches fully due to the fact that the positioning pin is pinned to a position free of any obstacle or the positioning air cylinder does not stretch to the middle position due to the fact that the positioning pin is blocked by an edge of one of the material-receiving pin hole of the material taking point, the empty-furnace feeding pin hole of the material taking point, the feeding pin holes or the empty-furnace taking pin holes.

6. The positioning material moving system according to claim 5, wherein compressed air employed by the positioning air cylinder has a pressure of 2.5 bar to 5 bar, and a compressed air supply end of the positioning air cylinder is provided with an adjustable pressure relief valve.

7. The positioning material moving system according to claim 5, wherein an inlet of each of the material-receiving pin hole of the material taking point, the empty-furnace feeding pin hole of the material taking point, the feeding pin holes and the empty-furnace taking pin holes employs a horn-shaped structure, each of the material-receiving pin hole of the material taking point, the empty-furnace feeding pin hole of the material taking point, the feeding pin holes and the empty-furnace taking pin holes is placed horizontally, and an underside of a bottom of each of the material-receiving pin hole of the material taking point, the empty-furnace feeding pin hole of the material taking point, the feeding pin holes and the empty-furnace taking pin holes has a bigger opening which is downward.

8. The positioning material moving system according to claim 4, further comprising a system management host and a human-machine interface, the human-machine interface is in signal connection with the controller, the system management host is connected with the controller by a network bus, and the controller is in communication with the material taking point and the first to $Q^{th}$ machines by a network bus.

\* \* \* \* \*